US008883040B2

(12) United States Patent
Roth et al.

(10) Patent No.: US 8,883,040 B2
(45) Date of Patent: *Nov. 11, 2014

(54) LUMINESCENT MATERIAL

(75) Inventors: Gundula Roth, Levenhagen (DE);
Walter Tews, Greifswald (DE);
Chung-Hoon Lee, Seoul (KR)

(73) Assignee: Seoul Semiconductor Co., Ltd.,
Ansan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,882

(22) Filed: Jul. 23, 2012

(65) Prior Publication Data

US 2012/0286207 A1    Nov. 15, 2012

Related U.S. Application Data

(63) Continuation of application No. 13/099,879, filed on May 3, 2011, now Pat. No. 8,252,203, which is a continuation of application No. 11/948,813, filed on Nov. 30, 2007, now Pat. No. 8,070,984, which is a continuation-in-part of application No. 11/024,722, filed on Dec. 30, 2004, now Pat. No. 8,070,983.

(30) Foreign Application Priority Data

Jun. 10, 2004 (KR) .................. 10-2004-0042397

(51) Int. Cl.
C09K 11/64 (2006.01)
C09K 11/66 (2006.01)
C09K 11/75 (2006.01)
C09K 11/77 (2006.01)
C09K 11/58 (2006.01)
C09K 11/74 (2006.01)
C09K 11/59 (2006.01)

(52) U.S. Cl.
CPC ......... *C09K 11/7734* (2013.01); *C09K 11/7792* (2013.01); *C09K 11/7709* (2013.01); *C09K 11/7735* (2013.01); *C09K 11/58* (2013.01); *C09K 11/753* (2013.01); *C09K 11/7783* (2013.01); *C09K 11/66* (2013.01); *C09K 11/665* (2013.01); *C09K 11/7714* (2013.01); *C09K 11/756* (2013.01); *C09K 11/666* (2013.01); *C09K 11/758* (2013.01); *C09K 11/7706* (2013.01); *C09K 11/7739* (2013.01); *C09K 11/7707* (2013.01); *C09K 11/7457* (2013.01); *C09K 11/757* (2013.01); *C09K 11/7742* (2013.01); *C09K 11/774* (2013.01); *C09K 11/7737* (2013.01); *C09K 11/592* (2013.01)
USPC ....... 252/301.4 R; 252/301.4 F; 252/301.4 P; 252/301.6 R; 252/301.6 F; 252/301.6 P; 252/301.4 H

(58) Field of Classification Search
USPC .................... 252/301.4 R–301.6 P
See application file for complete search history.

(56) References Cited

U.S. PATENT DOCUMENTS

| | | | |
|---|---|---|---|
| 2,110,162 A | 3/1938 | Leverenz |
| 2,402,760 A | 6/1946 | Leverenz |
| 2,570,136 A | 10/1951 | Lyon |
| 2,617,773 A | 11/1952 | Nagy et al. |
| 2,719,128 A | 9/1955 | Kressin |
| 2,780,600 A | 2/1957 | Wollentin |
| 3,143,510 A | 8/1964 | Wanmaker et al. |
| 3,598,752 A | 8/1971 | Sisneros |
| 3,644,212 A | 2/1972 | McAllister et al. |
| 3,893,939 A | 7/1975 | De Kalb et al. |
| 3,905,911 A | 9/1975 | Kelsey, Jr. et al. |
| 4,215,289 A | 7/1980 | De Hair et al. |
| 4,770,950 A | 9/1988 | Ohnishi |
| 4,810,416 A | 3/1989 | Hase |
| 4,972,086 A | 11/1990 | Bryan et al. |
| 5,032,316 A | 7/1991 | Takahashi et al. |
| 5,060,118 A | 10/1991 | Penrod et al. |
| 5,188,763 A | 2/1993 | Chenot et al. |
| 5,433,295 A | 7/1995 | Murphy |
| 5,472,636 A | 12/1995 | Forster et al. |
| 5,518,808 A | 5/1996 | Bruno et al. |
| 5,770,110 A | 6/1998 | Schrell et al. |
| 5,770,111 A | 6/1998 | Moriyama et al. |

(Continued)

FOREIGN PATENT DOCUMENTS

| AT | 410266 | 3/2003 |
| CN | 1218084 | 6/1999 |

(Continued)

OTHER PUBLICATIONS

Feldmann C., "Inorganic Luminescent Materials: 100 Years of Research and Application", Adv. Funct. Matter, 2003, pp. 511-516.

(Continued)

*Primary Examiner* — Carol M Koslow
(74) *Attorney, Agent, or Firm* — H.C. Park & Associates, PLC

(57) ABSTRACT

A luminescent material is disclosed. The luminescent material may include a first compound having a host lattice comprising first ions and oxygen. A first portion of the first ions may be substituted by copper ions. In one embodiment, the host lattice may include silicon, the copper ions may be divalent copper ions and the first compound may have an Olivine crystal structure, $\beta$-$K_2SO_4$ crystal structure, a trigonal Glaserite ($K_3Na(SO_4)_2$) or monoclinic Merwinite crystal structure, a tetragonal Ackermanite crystal structure, a tetragonal crystal structure or an orthorhombic crystal structure. In another embodiment, the copper ions do not act as luminescent ions upon excitation with the ultraviolet or visible light.

4 Claims, No Drawings

(56) References Cited

U.S. PATENT DOCUMENTS

| | | | |
|---|---|---|---|
| 5,853,614 A | 12/1998 | Hao et al. | |
| 5,952,681 A | 9/1999 | Chen | |
| 5,965,192 A | 10/1999 | Potter | |
| 5,998,925 A | 12/1999 | Shimizu et al. | |
| 6,045,722 A | 4/2000 | Leblans et al. | |
| 6,066,861 A | 5/2000 | Hohn et al. | |
| 6,084,250 A | 7/2000 | Justel et al. | |
| 6,373,184 B1 | 4/2002 | Suh et al. | |
| 6,472,765 B1 | 10/2002 | Sano et al. | |
| 6,482,664 B1 | 11/2002 | Lee et al. | |
| 6,565,771 B1 | 5/2003 | Ono et al. | |
| 6,670,751 B2 | 12/2003 | Song et al. | |
| 6,686,691 B1 | 2/2004 | Mueller et al. | |
| 6,842,664 B2 | 1/2005 | Harada et al. | |
| 6,982,045 B2 | 1/2006 | Menkara et al. | |
| 6,982,048 B1 | 1/2006 | Atwater et al. | |
| 6,987,353 B2 | 1/2006 | Menkara et al. | |
| 7,019,335 B2 | 3/2006 | Suenaga | |
| 7,029,602 B2 | 4/2006 | Oshio | |
| 7,045,078 B2 | 5/2006 | Choi | |
| 7,138,770 B2 | 11/2006 | Uang et al. | |
| 7,189,340 B2 * | 3/2007 | Shimomura et al. | 252/301.4 F |
| 7,204,607 B2 | 4/2007 | Yano | |
| 7,206,507 B2 | 4/2007 | Lee et al. | |
| 7,229,571 B2 | 6/2007 | Ezuhara et al. | |
| 7,244,965 B2 | 7/2007 | Andrews et al. | |
| 7,332,746 B1 | 2/2008 | Takahashi et al. | |
| 7,468,147 B2 | 12/2008 | Shida et al. | |
| 7,554,129 B2 | 6/2009 | Roth et al. | |
| 7,608,200 B2 | 10/2009 | Seto et al. | |
| 7,679,101 B2 | 3/2010 | Ota et al. | |
| 7,679,281 B2 | 3/2010 | Kim et al. | |
| 8,066,909 B2 | 11/2011 | Roth et al. | |
| 8,070,983 B2 * | 12/2011 | Roth et al. | 252/301.4 R |
| 8,070,984 B2 * | 12/2011 | Roth et al. | 252/301.4 R |
| 8,075,802 B2 * | 12/2011 | Roth et al. | 252/301.4 R |
| 8,089,084 B2 | 1/2012 | Roth et al. | |
| 8,137,589 B2 * | 3/2012 | Lee et al. | 252/301.6 R |
| 8,173,042 B2 * | 5/2012 | Lee et al. | 252/301.4 F |
| 8,252,203 B2 * | 8/2012 | Roth et al. | 252/301.4 R |
| 8,318,044 B2 * | 11/2012 | Lee et al. | 252/301.4 F |
| 8,440,106 B2 * | 5/2013 | Lee et al. | 252/301.4 F |
| 8,501,040 B2 * | 8/2013 | Lee et al. | 252/301.4 F |
| 2002/0015013 A1 | 2/2002 | Ragle | |
| 2003/0030063 A1 | 2/2003 | Sosniak et al. | |
| 2003/0038295 A1 | 2/2003 | Koda | |
| 2003/0168636 A1 | 9/2003 | Dobson et al. | |
| 2004/0051111 A1 | 3/2004 | Ota et al. | |
| 2004/0079957 A1 | 4/2004 | Andrews et al. | |
| 2004/0104391 A1 | 6/2004 | Maeda et al. | |
| 2004/0135504 A1 | 7/2004 | Tamaki et al. | |
| 2004/0136891 A1 | 7/2004 | Kijima et al. | |
| 2004/0206970 A1 | 10/2004 | Martin | |
| 2004/0251809 A1 | 12/2004 | Shimomura et al. | |
| 2005/0001225 A1 | 1/2005 | Yoshimura et al. | |
| 2005/0001537 A1 | 1/2005 | West et al. | |
| 2005/0029927 A1 | 2/2005 | Setlur et al. | |
| 2005/0117334 A1 | 6/2005 | Lee et al. | |
| 2005/0139846 A1 | 6/2005 | Park et al. | |
| 2005/0141048 A1 | 6/2005 | Mizutani | |
| 2005/0239227 A1 | 10/2005 | Aanegola et al. | |
| 2005/0264161 A1 | 12/2005 | Oaku et al. | |
| 2005/0274930 A1 | 12/2005 | Roth et al. | |
| 2005/0274972 A1 | 12/2005 | Roth et al. | |
| 2006/0076883 A1 | 4/2006 | Himaki et al. | |
| 2006/0158090 A1 | 7/2006 | Wang et al. | |
| 2006/0261309 A1 | 11/2006 | Li et al. | |
| 2006/0261350 A1 | 11/2006 | Kawazoe et al. | |
| 2006/0267042 A1 | 11/2006 | Izuno et al. | |
| 2007/0029526 A1 | 2/2007 | Cheng et al. | |
| 2007/0247051 A1 | 10/2007 | Kuze et al. | |
| 2007/0284563 A1 | 12/2007 | Lee et al. | |
| 2008/0036364 A1 | 2/2008 | Li et al. | |
| 2008/0067472 A1 | 3/2008 | Roth et al. | |
| 2008/0067920 A1 | 3/2008 | Roth et al. | |
| 2008/0224163 A1 | 9/2008 | Roth et al. | |
| 2009/0050847 A1 | 2/2009 | Xu et al. | |
| 2009/0050849 A1 | 2/2009 | Lee et al. | |
| 2009/0134413 A1 | 5/2009 | Roth et al. | |
| 2009/0152496 A1 | 6/2009 | Roth et al. | |
| 2009/0262515 A1 | 10/2009 | Lee et al. | |
| 2009/0303694 A1 | 12/2009 | Roth et al. | |
| 2010/0002454 A1 * | 1/2010 | Lee et al. | 362/373 |
| 2010/0165645 A1 * | 7/2010 | Lee et al. | 362/373 |
| 2010/0207132 A1 | 8/2010 | Lee et al. | |

FOREIGN PATENT DOCUMENTS

| | | |
|---|---|---|
| CN | 1289454 | 3/2001 |
| CN | 1317537 | 10/2001 |
| CN | 1344777 | 4/2002 |
| CN | 1434521 | 8/2003 |
| CN | 2624578 | 7/2004 |
| CN | 1581503 | 2/2005 |
| CN | 2690724 | 4/2005 |
| CN | 1702809 | 11/2005 |
| CN | 1706043 | 12/2005 |
| CN | 1707819 | 12/2005 |
| DE | 10233050 | 2/2004 |
| DE | 10259946 | 7/2004 |
| EP | 0094132 | 11/1983 |
| EP | 0382295 | 8/1993 |
| EP | 0765925 | 4/1997 |
| EP | 0862794 | 9/1998 |
| EP | 0896994 | 2/1999 |
| EP | 1249873 | 10/2002 |
| EP | 1605030 | 12/2005 |
| EP | 2031038 | 3/2009 |
| GB | 1336053 | 11/1973 |
| GB | 2016034 | 9/1979 |
| JP | 31-1118 | 2/1956 |
| JP | 33-8177 | 9/1958 |
| JP | 38-6082 | 5/1963 |
| JP | 39-8803 | 5/1964 |
| JP | 47-6258 | 4/1974 |
| JP | 49-38994 | 10/1974 |
| JP | 55-135190 | 10/1980 |
| JP | 57-109886 | 7/1982 |
| JP | 61-258892 | 11/1986 |
| JP | 62-197487 | 9/1987 |
| JP | 5-78659 | 3/1993 |
| JP | 9-40946 | 2/1997 |
| JP | 9-153644 | 6/1997 |
| JP | 9-279140 | 10/1997 |
| JP | 10-321914 | 12/1998 |
| JP | 11-177143 | 7/1999 |
| JP | 2000-260580 | 9/2000 |
| JP | 2000-294387 | 10/2000 |
| JP | 2001-308393 | 11/2001 |
| JP | 2001-524163 | 11/2001 |
| JP | 2002-50795 | 2/2002 |
| JP | 2002-057376 | 2/2002 |
| JP | 2002-094122 | 3/2002 |
| JP | 2002-97465 | 4/2002 |
| JP | 2002-97466 | 4/2002 |
| JP | 2002-173677 | 6/2002 |
| JP | 2002-335019 | 11/2002 |
| JP | 2002-359403 | 12/2002 |
| JP | 2002-368277 | 12/2002 |
| JP | 2003-064358 | 3/2003 |
| JP | 2003-133595 | 5/2003 |
| JP | 2003-152229 | 5/2003 |
| JP | 2003-183649 | 7/2003 |
| JP | 2003-224306 | 8/2003 |
| JP | 2003-321675 | 11/2003 |
| JP | 2004-006582 | 1/2004 |
| JP | 2004-010786 | 1/2004 |
| JP | 2004-505470 | 2/2004 |
| JP | 2004-071726 | 3/2004 |
| JP | 2004-71807 | 3/2004 |
| JP | 2004-079867 | 3/2004 |
| JP | 2004-88011 | 3/2004 |
| JP | 2004-127988 | 4/2004 |
| JP | 2004-134699 | 4/2004 |

(56) References Cited

FOREIGN PATENT DOCUMENTS

| | | |
|---|---|---|
| JP | 2004-192833 | 7/2004 |
| JP | 2001-115157 | 12/2004 |
| JP | 2005-100799 | 4/2005 |
| JP | 2005-100800 | 4/2005 |
| JP | 2005-101296 | 4/2005 |
| JP | 2005-153606 | 6/2005 |
| JP | 2005-167177 | 6/2005 |
| JP | 2005-354027 | 12/2005 |
| JP | 2006-073656 | 3/2006 |
| JP | 2006-173433 | 6/2006 |
| JP | 2006-252944 | 9/2006 |
| JP | 2007-186674 | 7/2007 |
| JP | 2009-007545 | 1/2009 |
| KR | 10-232395 | 12/1999 |
| KR | 10-2001-0032450 | 4/2001 |
| KR | 10-2001-0050839 | 6/2001 |
| KR | 10-2001-0101910 | 11/2001 |
| KR | 10-2002-0000835 | 1/2002 |
| KR | 10-2002-0053975 | 7/2002 |
| KR | 10-0392363 | 7/2002 |
| KR | 10-2002-0079513 | 10/2002 |
| KR | 10-2003-0063211 | 7/2003 |
| KR | 10-2003-0082395 | 10/2003 |
| KR | 10-0426034 | 7/2004 |
| KR | 10-2004-0088418 | 10/2004 |
| KR | 10-2005-0008426 | 1/2005 |
| KR | 10-2005-0070349 | 7/2005 |
| KR | 10-2005-0098462 | 10/2005 |
| KR | 10-2005-0106945 | 11/2005 |
| KR | 10-2005-0117164 | 12/2005 |
| KR | 10-2006-0034056 | 4/2006 |
| KR | 10-0626272 | 9/2006 |
| KR | 10-2006-0134728 | 12/2006 |
| KR | 10-2007-0016900 | 2/2007 |
| KR | 10-2007-0050833 | 5/2007 |
| KR | 10-2007-0086483 | 8/2007 |
| KR | 10-2008-0046789 | 5/2008 |
| KR | 10-2008-0075181 | 7/2008 |
| TW | I328885 | 3/1999 |
| TW | 546854 | 8/2003 |
| WO | 96-32457 | 10/1996 |
| WO | 98-05078 | 2/1998 |
| WO | 98-12757 | 3/1998 |
| WO | 98-39805 | 9/1998 |
| WO | 98-42798 | 10/1998 |
| WO | 00-19546 | 4/2000 |
| WO | 00/33390 | 6/2000 |
| WO | 01-41215 | 6/2001 |
| WO | 02-054502 | 7/2002 |
| WO | 02-054503 | 7/2002 |
| WO | 02-089219 | 11/2002 |
| WO | 03-021691 | 3/2003 |
| WO | 03/030274 | 4/2003 |
| WO | 2004/036962 | 4/2004 |
| WO | 2004-085570 | 10/2004 |
| WO | 2004-111156 | 12/2004 |
| WO | 2005-068584 | 7/2005 |
| WO | 2005-112137 | 11/2005 |
| WO | 2005109532 | 11/2005 |
| WO | 2006-043682 | 4/2006 |
| WO | 2006-068359 | 6/2006 |
| WO | 2006-081803 | 8/2006 |
| WO | 2006/109659 | 10/2006 |
| WO | 2007-035026 | 3/2007 |
| WO | 2007-055538 | 5/2007 |
| WO | 2007055538 | 5/2007 |
| WO | 2007-069869 | 6/2007 |
| WO | 2007-114614 | 11/2007 |
| WO | 2009028818 | 3/2009 |

OTHER PUBLICATIONS

G. Blasse, B.C. Grabmeier, "Luminescent Materials", Springer, 1994, 87-90.

B. Cordero, V. Gómez, A. E. Platero-Prats, M. Revés, J. Echeverria, E Cremades, F. Barragán, and S. Alvarez, "Covalent radii revisted", Dalton Trans., (2008), pp. 2832-2838.

R.J. Angel et al., "Structure and twinning of single-crystal MgSiO3 garnet synthisized at 17 GPa and 1800 ° C", American Minerologist, 74 (1989) pp. 509-512.

G.L. Miessler, D.A. Tarr, "Inorganic Chemistry", (2004) pp. 117-118, 3rd ed., Pearson / Prentice Hall, New Jersey, US.

P.A. Cox, "Transition Metal Oxides", Oxford University Press, 1995, p. 105.

Garcia Solé, L.E. Bausá, D. Jaque, "An Introduction to the Optical Spectroscopy of Inorganic Solids", Wiley, 2005, pp. 163-164.

G. Blasse, B.C. Grabmeier, "Luminescent Materials", Springer, 1994, p. 25.

S. Shionoya, W.M. Yen, "Phospher Handbook" CRC press, 1999, ch. 3.3, pp. 183-184.

Garcia Solé, L.E. Bausá, D. Jaque, "An Introduction to the Optical Spectroscopy of Inorganic Solids", Wiley, 2005, pp. 132-133.

S. Shionoya, W.M. Yen, "Phosphor Handbook" CRC press, 1999, ch. 3.3, pp. 179-182.

G. Blasse, "Characteristic Luminescence", Philips Technical Review, vol. 31, 1970, pp. 304-332.

G. Blasse, B.C. Grabmeier, "Luminescent Materials", Springer, 1994, pp. 40-47.

R. Chen, "Developments in Luminescence and Display Materials Over the Last 100 Years as Reflected in Electrochemical Society Publications" the Electrochemical Society, pp. 69-78, 2002.

Indian Office Action of Indian Application No. 2468/KOLNP/2007 issued on Jan. 28, 2011, corresponding to U.S. Appl. No. 12/098,263.

Non-Final Office Action of U.S Appl. No. 12/854,001 issued on Apr. 6, 2011.

Chinese Office Action of Chinese Patent Application No. 200880105091.8 issued on Apr. 1, 2011.

Chinese Office Action of Chinese Patent Application No. 201010198537.5 issued on Mar. 18, 2011.

Chinese Office Action of Chinese Patent Application No. 201010185274.4 issued on Mar. 2, 2011.

Austrian Office Action for AT Application No. 9514/2005 issued on Jun. 1, 2011.

Austrian Office Action for AT Application No. 1545/2010-1 issued on May 31, 2011.

Final Office Action of U.S. Appl. No. 12/731,811 issued on Jul. 29, 2011.

Non-Final Office Action dated Apr. 2, 2012 issued for U.S. Appl. No. 13/279,878.

Notice of Allowance dated Apr. 11, 2012 issued for U.S. Appl. No. 12/093,441.

Final Office Action dated Apr. 18, 2012 issued for U.S. Appl. No. 12/491,457.

Final Office Action dated Apr. 26, 2012 issued for U.S. Appl. No. 12/491,780.

International Search Report dated Jul. 12, 2007 for PCT Application No. PCT/KR2007/001587.

International Search Report dated Mar. 21, 2007 for PCT Application No. PCT/KR2006/005500.

International Search Report dated Feb. 20, 2007 for PCT Application No. PCT/KR2006/004716.

International Search Report dated Oct. 24, 2005 for PCT Application No. PCT/KR2005/002332.

International Search Report dated Oct. 13, 2005 for PCT Application No. PCT/KR2005/002333.

International Search Report dated Aug. 12, 2005 for PCT Application No. PCT/KR2005/001288.

International Search Report dated Aug. 12, 2005 for PCT Application No. PCT/KR2005/001287.

International Search Report dated Feb. 27, 2009 for PCT Application No. PCT/KR2008/004734.

International Search Report dated Feb. 11, 2009 for PCT Application No. PCT/KR2008/004733.

Joung Kyu Park, et al., "Silicate Phosphors for White LEDs Identified Through Combinatorial Chemistry", Electrochemical and Solid-State Letters, vol. 10(2), pp. J15-J18, (2007), XP-00251106706-11-12).

(56) References Cited

OTHER PUBLICATIONS

Joung Kyu Park, et al., "Luminescence Characteristics of Yellow Emitting Ba3SiO5:EU2+ Phosphor", Journal of Materials Science 40 (2005), pp. 2069-2071, XP-002511068.
Search Report dated Feb. 2, 2009 for EP Application No. EP08014684.
S.D. Jee, et al., "Photoluminescence properties of Eu2+ -activated Sr3SiO5 Phosphors," J. Mater Sci. 41 (2006), pp. 3139-3141.
G. Blasse, et al., "Fluorescence of Europium2+-activated silicates," Philips Res. Repts 23 (1968), pp. 189-199.
G. Roth, et al. "Advanced Silicate Phosphors for improved white LED", Global Phosphor Summit Seoul/Korea, Mar. 5-7, 2007.
Non-Final Office Action dated Apr. 24, 2012 issued for U.S. Appl. No. 12/854,001.
H.G. Kang, et al., "Embodiment and Luminescence Properties of Sr3SiO5:Eu(yellow-orange phosphor) by co-doping lanthanide", Solid State Phenomena, vol. 124-126 (2007) pp. 511-514.
T.L. Barry, "Fluorescence of Eu2+ Activated Phases in Binary Alkaline Earth Orthosilicate Systems", J. Electrochem Soc., Nov. 1968, pp. 1181-1184.
Notice of Allowance dated Dec. 1, 2008 issued in U.S. Appl. No. 11/024,702.
Chinese Office Action corresponding to Patent App No. 2005800150173 dated Dec. 28, 2007.
Final OA dated Oct. 22, 2007 issued in U.S. Appl. No. 11/024,722.
Office Action dated Dec. 28, 2007 corresponding to China App No. 200580016844.4.
X. W. Sun et al., "Pulsed Laser Deposition of Silicate Phosphor Thin Films", Appl. Phys. A 69, 1999, 5 pp.
W.L. Wanmaker et al. "Luminescence of Phosphors Based on the Host Lattice ABGe2O6 (A, B=Ca, Sr, Ba)" Journal of Solid State Chemistry 3, (1971), pp. 194-196.
Declaration under CFR 1.132 for related U.S. Appl. No. 11/024,722 dated Aug. 24, 2007.
Non-Final OA mailed May 23, 2007 for U.S. Appl. 11/024,722 entitled "Luminescent Material".
Ageeth A. Bol et al., "Luminescence of ZnS:Cu2+", Journal of Luminescence, No. 99, 2002, pp. 325-334.
J.F. Suyver et al., "Luminescence of nanocrystalline ZnSe:Cu", Applied Physics Letters, vol. 79, No. 25, Dec. 17, 2001, pp. 4222-4224.
Ping Yang et al., "Photoluminescence of Cu+-doped and Cu2+-doped ZnS nanocrystallites", Journal of Physics and Chemistry of Solids, No. 63, 2002, pp. 638-643.
S. Shionoya et al., (Eds.), "Principal phosphor materials and their optical properties" in Phosphor Handbook, CRC Press, 1999, pp. 231-255.
A. Scacco et al., "Optical Spectra of Cu2+ Ions in LiF Crystals", Radiation Effects and Defects in Solids, vol. 134, 1995, pp. 333-336.
Lujcan Dubicki et al., "The First d-d Fluorescence of a Six-Coordinate Copper (II) Ion", J. Am. Chem. Soc. 1989, No. 111, pp. 3452, 3454.
A.B.P. Lever, "Inorganic Electronic Spectroscopy", 2nd ed., Elsevier, 1984, pp. 355 and 557-559.
A.G. Shenstone, "The Third Spectrum of Copper (Cu III)", Journal of Research of the National Bureau of Standards—A. Physics and Chemistry, vol. 79A, No. 3, May-Jun. 1975, pp. 497-521.
First Office Action of the PRC to Chinese Patent App No. 20051002304.2 dated Feb. 15, 2008.
Yang, "Up- Conversion Fluorescence in Er3 + Yb3 + Co- Doped Oxy—Fluoride Compound Materials Based on GeO2", Natural Science Journal of Xiangtan University, vol. 23, No. 2, 2001, pp. 37-41.
Bernhardt, Investigations of the Orange Luminescence of PbMoO4 Crystals, Phys. Stat. Sol (a), 91, 643, 1985, pp. 643-647.
Butler, "Fluorescent Lamp Phosphors", The Pennsylvania State University Press, 1980, pp. 175-176.
Butler, "Fluorescent Lamp Phosphors", The Pennsylvania State University Press, 1980, pp. 181-182.
Wanmaker, et al., Luminescence of Copper-Activated Orthophosphates of the Type ABPO (A=Ca, Sr, or Ba and B=Li, Na or K), Journal of the Electrochemical Society, vol. 109, No. 2 pp. 109-113, Feb. 1962.
Butler, "Fluorescent Lamp Phosphors", The Pennsylvania State University Press, 1980, pp. 281-284.
"Phosphors for Mercury Lamps" https:/www.lamptech.co.uk/Docuemnts/M14%20Phosphors.htm 2003 (2 pages).
Blasse, "Radiationless Processes in Luminescent Materials", Radiationless Processes, 1980, pp. 287-289, 293.
Shinonoya, "Phosphor Handbook", edited under the auspice of Phosphor Research Society, CRC Press, 1999, pp. 204-205.
Shinonoya, "Phosphor Handbook", edited under the auspice of Phosphor Research Society, CRC Press, 1999, p. 238-239, 241.
Wanmaker, "Luminescence of Copper-Activated Calcium and Strontium Orthophosphates", Journal of the ElectroChemical Society, pp. 1027-1031, Vol. 109, No. 2; 1962.
van Gool, "Philips Res. Rept. Suppl." 3, 1, 1961, pp. 1-9, 30-51, 84-85.
Declaration Under Rule 37 CFR 1.132 of Ulrich Kynast dated Sep. 6, 2008.
Preliminary Notice of First Office Action with Search Report issued on May 15, 2013 in Taiwanese Patent Application No. 095147024.
International Search Report for PCT/KR2010/003302 issued on Jan. 3, 2011, corresponding to U.S. Appl. No. 12/767,253.
Final Office Action dated Dec. 8, 2010 in U.S. Appl. No. 11/948,813.
Final Office Action dated Dec. 23, 2010 in U.S. Appl. No. 11/569,060.
Non Final Office Action dated Dec. 29, 2010 in U.S. Appl. No. 12/731,811.
Final Office Action dated Dec. 7, 2010 in U.S. Appl. No. 11/948,845.
Non Final Office Action dated Nov. 26, 2010 in U.S. Appl. No. 12/440,001.
Non Final Office Action dated Nov. 24, 2010 in U.S. Appl. No. 12/093,441.
Final Office Action dated Nov. 30, 2010 in U.S. Appl. No. 11/024,722.
Notice of Allowance dated Aug. 18, 2010 in U.S. Appl. No. 12/098,263.
Final Office Action dated May 11, 2010 in U.S. Appl. No. 12/098,263.
Non Final Office Action dated Mar. 17, 2010 in U.S. Appl. No. 11/024,722.
Non Final Office Action dated Aug. 17, 2010 in U.S. Appl. No. 11/948,845.
EP Search Report dated Sep. 1, 2010 in EP Appl No. 08015119 correpsonding to U.S. Appl. No. 12/440,001.
EP Search Report dated Oct. 6, 2010 in Ep Appl No. 07745750.5—corresponding to U.S. Appl. No. 12/295,438.
Non Final Office Action dated Jun. 16, 2010 in U.S. Appl. No. 12/097,741.
Final Office Action dated Nov. 12, 2010 in U.S. Appl. No. 12/097,741.
Non-Final Office Action dated Aug. 10, 2010 in U.S. Appl. No. 11/024,722.
Final Office Action dated Jun. 21, 2010 in U.S. Appl. No. 11/569,060.
Tomas L. Barry "Equilibria and Eu2+ luminescence of subsolidus phases bounded by Ba3MgSi2O8, Sr3MgSi2O8 and Ca3MgSi2O8" pp. 733-738 vol. 115, No. 7 J. Electrochem Soc.: Solid State Sceince Jul. 1968.
Non-final office action dated Nov. 29, 2006 issued in U.S. Appl. No. 11/024,722, filed Dec. 30, 2004.
CN Office Action dated Feb. 5, 2010 in CN Appl. No. 2005100023042.
European Search Report of Oct. 26, 2010 in EP 10 17 7817, corresponding to U.S. Appl. No. 11/024,722.
Non-Final Office Action dated Aug. 18, 2010 in U.S. Appl. No. 11/948,813.
Non-Final Office Action dated Aug. 10, 2010 in U.S. Appl. No. 12/731,811.
IP Australia Office Action dated Jul. 2, 2010 for AU Patent Appl. No. 2005-319965, corresponding to U.S. Appl. No. 12/098,263.

(56) References Cited

OTHER PUBLICATIONS

TW Office Action of Sep. 10, 2010 in TW Patent Appl. No. 098123458.
European Search Report of Sep. 23, 2010 in European Patent Appl. No. 10 16 4970.
Non-final office action dated May 29, 2009 issued in U.S. Appl. No. 11/024,722, filed Dec. 30, 2004.
Notice of Allowance dated May 4, 2009 issued in U.S. Appl. No. 11/024,702.
Non-final office action dated Nov. 29, 2007 issued in U.S. Appl. No. 11/024,702, filed Dec. 30, 2004.
Non-final office action dated Aug. 12, 2009 issued in U.S. Appl. No. 11/569,060, filed Jun. 22, 2007.
Non-final office action dated Jan. 13, 2010 issued in U.S. Appl. No. 11/569,060, filed Jun. 22, 2007.
Non-final office action dated Nov. 17, 2009 issued in U.S. Appl. No. 12/097,741, filed Oct. 9, 2008.
Bogner et al., DE 102 33 050 A1, May 5, 2004, Machine Traslation.
Final office action dated Feb. 7, 2007 issued in U.S. Appl. No. 11/024,702, filed Dec. 30, 2004.
Non-final office action dated Jun. 22, 2006 issued in U.S. Appl. No. 11/024,702, filed Dec. 30, 2004.
Notice of Allowance of U.S. Appl. No. 11/948,813 issued on Aug. 22, 2011.
Final office action dated Oct. 28, 2009 issued in U.S. Appl. No. 11/024,722, filed Dec. 30, 2004.
Non-final office action dated May 23, 2007 issued in U.S. Appl. No. 11/024,722, filed Dec. 30, 2004.
Non-final office action dated Nov. 14, 2008 issued in U.S. Appl. No. 11/024,722, filed Dec. 30, 2004.
Non-final office action dated Nov. 2, 2009 issued in U.S. Appl. No. 12/098,263.
Ralchenko, Yu., Kramida, A.E., Reader, J. and NIST ASD Team (2008). NIST Atomic Spectra Database (version 3.1.5), [Online]. Available: http://physics.nist.gov/asd3 [Feb. 27, 2009]. National Institute of Standards and Technology, Gaithersburg, MD.

N. S. Akhmetov, "Inorganic Chemistry", Moscow "Vysshaya Shkola", 1975; (partial translation; translated pp. 332-333, 372-373, 384-385, 427, 432, 436, 445, 471, 476, 486, 491, 496-497, 501, 546-549).
Markovsky L, Ya. et al., Phosphors (Moscow-Leningrad, KHIMIYA Publishers, 1966, p. 7 (partial translation).
Search Report dated Apr. 11, 2006 for EP Application No. EP04106880.0.
Search Report dated Nov. 5, 2008 for EP Application No. EP06812549.1.
Search Report dated Aug. 21, 2007 for EP Application No. EP04106882.6.
Non-Final Office Action issued on Sep. 13, 2013 in U.S. Appl. No. 13/665,744.
Non-Final Office Action of U.S. Appl. No. 12/491,457 mailed on Nov. 17, 2011.
Non-Final Office Action of U.S. Appl. No. 12/491,780 dated on Dec. 7, 2011.
Non-Final Office Action of U.S Appl. No. 13/004,554 issued on Mar. 15, 2011.
Notice of Allowance of U.S Appl. No. 11/024,722 issued on Mar. 10, 2011.
Notice of Allowance of U.S. Appl. No. 13/004,554 mailed on Dec. 13, 2011.
Notice of Allowance of U.S. Appl. No. 11/948,845 issued on Mar. 23, 2011.
Non-Final Office Action of U.S. Appl. No. 12/098,263 issued on Mar. 30, 2011.
Non-Final Office Action of U.S. Appl. No. 12/295,438 dated on Jan. 12, 2012.
Chinese Office Action of CN Patent Application No. 201010185246.2 dated Dec. 27, 2011 corresponding to U.S. Appl. No. 13/004,554.
S. Shinoya et al. (Eds.), "Principal phosphor materials and their optical properties" in Phosphor Handbook, CRC Press, 1999, p. 826.
Notice of Allowance of U.S. Appl. No. 12/098,263 issued on Oct. 11, 2011.
Final Office Action of U.S. Appl. No. 12/854,001 issued on Oct. 11, 2011.

* cited by examiner

LUMINESCENT MATERIAL

CROSS REFERENCE TO RELATED APPLICATIONS

The present application is a continuation of U.S. patent application Ser. No. 13/099,879, filed on May 3, 2011, now U.S. Pat. No. 8,070,984, which is a continuation of U.S. patent application Ser. No. 11/948,813, filed on Nov. 30, 2007, now U.S. Pat. No. 8,070,984, which is a continuation-in-part of U.S. patent application Ser. No. 11/024,722, filed on Dec. 30, 2004, now U.S. Pat. No. 8,070,983, and claims priority from and the benefit of Korean Patent Application No. 10-2004-0042397, filed on Jun. 10, 2004, which is hereby incorporated by reference for all purposes as if fully set forth herein.

BACKGROUND OF THE INVENTION

1. Field of the Invention

Embodiments of the present invention relate generally to fluorescent materials containing rare earth elements and, more particularly, to such luminescent materials for exciting ultraviolet as well as visible light containing lead- and/or copper-containing compounds.

2. Description of the Related Art

Lead and copper activated materials are known for short wave excitation, e.g. from a low pressure mercury lamp, such as barium disilicate activated by lead (Keith H. Butler, The Pennsylvania State University Press, 1980, S 175, orthosilicate activated by lead (Keith H. Butler, The Pennsylvania State University Press, 1980, S. 181), akermanites activated by lead, or Ca-metasilicate activated by $Pb^{2+}$.

Generally, the maxima of the emission bands of such lead activated phosphors are located between 290 nm and 370 nm at 254 nm excitation. Bariumdisilicate activated by lead is an U.V. emitting phosphor which currently is used in sun parlor lamps.

Lead has in the ground state $^1S_0$ two outer electrons. The electron configuration of the ground state is $d^{10}s^2$, so that the lowest excited state has $d^{10}sp$ configuration. The excited sp configuration has four levels, $^3P_0$, $^3P_1$, $^3P_2$ and $^1P_1$, which can be achieved between 165.57 nm ($^3P_0$) and 104.88 nm ($^1P_1$) in the free ion. Transitions between $^1S_0$ and $^1P_1$ excited level are allowed by all selection rules. While transitions between $^1S_0$ and $^3P_0$ are only allowed with the lowest symmetry, transitions between $^1S_0$ and $^3P_1$ as well as $^3P_2$ are allowed only under certain conditions. However, excitation between 180 and 370 nm has the same emission. Excitation with wavelength longer than 370 nm is not possible.

Otherwise, luminescent materials are known having lead as a host lattice component. Molybdate phosphors containing $MoO_4^{2-}$ centers are described in Bernhardt, H. J., Phys. Stat. Sol. (a), 91, 643, 1985. $PbMoO_4$ shows at room temperature red emission with an emission maximum at 620 nm under photoexcitation at 360 nm.

However, such emission is not caused by lead itself. In molybdates the luminescence properties are not caused by the metal ion $M^{2+}$ ($M^{2+}MoO_4$ where $M^{2+}$=Ca, Sr, Cd, Zn, Ba, Pb etc). Here, defect centers of $MoO_4^{2-}$ ions coupled to $O^{2-}$-ion vacancies seem to be the reason. Nevertheless, the $Pb^{2+}$-ion influences the preferred emission properties because it stabilizes the host lattice.

As a familiar example, tungstates $(Ca,Pb)Wa_4$ as mixed crystals have a strong green emission with high quantum output of 75% (Blasse, G, Radiationless processes in luminescent materials, in Radiationless Processes, DiBartolo, B., Ed. Plenum Press, New York, 1980, 287). Under 250 nm excitation $PbWO_4$ shows blue emission and under 313 nm excitation $PbWO_4$ has an orange emission band, which can be caused by Schottky defects or by impurity ions (Phosphor Handbook, edited under the Auspice of Phosphor Research Society, CRC Press New York, 1998, S 205).

Copper was used as a monovalent activator in orthophosphates (Wanmaker, W. L. and Bakker, C., J. Electrochem. Soc., 106, 1027, 1959) with an emission maximum at 490 nm. The ground state of monovalent copper is a filled shell $3d^{10}$. That is the level $^1S_0$. After exciting the lowest excited configuration is $3d^9 4s$. This configuration has two terms, $^3D$ and $^1D$. The next higher configuration, $3d^9 4p$, gives 6 terms $^3P°$, $^3F°$, $^3D°$, $^1F°$, $^1D°$ and $^{16}p°$. The transitions between the ground state $^1S_0$ and the $^1D$ or $^3D$ are forbidden by parity or spin, respectively. In copper ions, the excitation to the crystal field levels of 4p terms are allowed. Emission will be got either by a direct return from the crystal field odd state to the ground state or by a combination of transitions first from the odd state to a crystal field level and after that a second transition from these $^3D$ or $^1D$ state of the $3d^9 4s$ configuration to the ground state.

The ground state of bivalent copper has $3d^9$-configuration. That is the level $^2D_{5/2}$. In the bivalent copper, one of the d-electrons can be excited to the 4s or 4p orbital. The lowest exciting configuration is the $3d^8 4s$ with two quartet terms $^4F$, $^4P$ and four doublet terms, $^2F$, $^2D$, $^2P$ and $^2G$ without emission caused by forbidden transitions. The higher exciting configuration is the $3d^8 4p$-configuration with four terms $^4D°$, $^4G°$, $^4F°$, and $^4p°$, where emission can occur.

Copper activated or co-activated sulphide-phosphors are well known and they are commercial used for cathode ray tubes. The green-emitting ZnS:Cu, Al (wherein, the copper is used as activator and Al is used as co-activator) is very important in CRT applications.

In zinc-sulphide phosphors, the luminescent materials can be classified into five kinds, depending on the relative ratio of the concentration of activators and co-activators (van Gool, W., Philips Res. Rept. Suppl., 3, 1, 1961). Here, the luminescent centers are formed from deep donors or deep acceptors, or by their association at the nearest-neighbor sites (Phosphor Handbook, edited under the Auspice of Phosphor Research Society, CRC Press New York, 1998, S. 238).

Orthophosphates activated by copper (Wanmaker, W. L., and Spier, H. L., JECS 109 (1962), 109), and pyrophosphates, alumosilicates, silicates, and tripolyphosphates all activated by copper are described in "Keith H. Butler, The Pennsylvania State University Press, 1980, S. 281". However, such phosphors can only be used for a short wave U.V. excitation. Because of their unstable chemical properties and their temperature behavior, they cannot be used in fluorescent lamps.

It has been observed that conventional luminescent materials are generally unstable in water, air humidity, water steam and polar solvents.

SUMMARY OF THE INVENTION

One embodiment exemplarily described herein can be generally characterized as a luminescent material for a light emitting diode (LED) that includes a first compound including a host lattice and a luminescent ion within the host lattice. The host lattice may include first ions and oxygen. A first portion of the first ions may be substituted by divalent copper ions. The first compound may emit light upon excitation with ultraviolet light or visible light emitted by the LED. The first compound may have an Olivine crystal structure, a $\beta$-$K_2SO_4$ crystal structure, a trigonal Glaserite ($K_3Na(SO_4)_2$) or monoclinic Merwinite crystal structure, a tetragonal Ackermanite crystal structure, a tetragonal crystal structure or an orthorhombic crystal structure. According to another embodiment, the luminescent ion includes at least one of Bi, Sn, Sb, Sc, Y, La, In, Ce, Pr, Nd, Pm, Sm, Eu, Gd, Tb, Dy, Ho, Er, Tm, Yb and Lu. According to another embodiment, the first compound includes Ge. According to another embodiment, the luminescent material further includes at least one second compound selected from the group consisting of an aluminate, a silicate, an antimonite, a germinate, a germinate-silicate and a phosphate. According to another embodiment, the luminescent material emits white light upon excitation with ultraviolet light or visible light.

Another embodiment exemplarily described herein can be generally characterized as a luminescent material for a light emitting diode (LED) that includes a first compound including a host lattice and a luminescent ion within the host lattice. The host lattice may include first ions and oxygen. A first portion of the first ions may be substituted by copper ions. The first compound may emit light upon excitation with ultraviolet light or visible light emitted by the LED. However, the copper ions do not act as luminescent ions upon excitation with the ultraviolet light or visible light. An additional object of the present invention is to provide lead and/or copper doped luminescent materials, which give high color temperature range about 2,000K to 8,000K or 10,000K and CRI over 90 in LED.

DETAILED DESCRIPTION

According to embodiments exemplarily described herein, a luminescent material may include one or more lead- and/or copper-containing chemical compounds. The luminescent material may be excited by UV and/or visible (e.g., blue) light. In some embodiments, the lead- and/or copper-containing chemical compounds may be generally characterized as including a host lattice having anions and cations. In some embodiments, at least a portion of the cations are divalent cations. In some embodiments, the divalent cations include alkaline earth ions. In some embodiments, at least a portion of the divalent cations of the host lattice are substituted by divalent lead and/or divalent copper ions.

As mentioned above, conventional luminescent materials are generally unstable in water, air humidity, water steam and polar solvents. However, due to a higher covalency and a lower basicity, the substitutionally-incorporated divalent lead and/or divalent copper ions in the host lattice of the chemical compound yields luminescent materials having improved resistance against water, air humidity and polar solvents.

The divalent lead and/or divalent copper ions within the host lattice do not act as activators (also referred to herein as "luminescent ions") and, therefore do not luminance. Rather, it has been found that these ions tend to influence the crystal field splitting as well as the covalency of the chemical compound. As a result, the substitutional incorporation of divalent lead and/or copper ions within the host lattice tends to influence luminescent-optical properties of the chemical compounds so as to improve luminescent intensity and desirably shift the emission maxima, color points, and shape of emission spectra.

It has been found that phosphors having chemical compounds that contain substitutionally-incorporated divalent lead and/or divalent copper ions show improved emission intensities as compared with phosphors having chemical compounds that do not contain substitutionally-incorporated divalent lead and/or divalent copper ions.

In addition, it has been found that phosphors having chemical compounds that contain substitutionally-incorporated divalent lead and/or divalent copper ions tend to show improved luminescent properties for excitation wavelength higher than about 360 nm. At excitation wavelengths higher than about 360 nm, the divalent lead and/or divalent copper ions do not exhibit their own radiation transfers due to the energy levels of their electron configuration, so that any kind of exciting radiation cannot be lost. Furthermore, by substitutionally incorporating divalent lead and/or divalent copper ions, the emission wavelength can be shifted to higher or lower energies as desired.

Lead ions having an ionic radius of 119 pm can substitute the alkaline earth ions Ca having an ionic radius of 100 pm and Sr having an ionic radius of 118 pm very easily. The electro negativity of lead with 1.55 is much higher than that of Ca (1.04) and Sr (0.99). The preparation of substances containing lead is complicated due to the possibility of an oxidation of these ions in reducing atmospheres. For the preparation of lead-containing compounds, which need reducing atmosphere, special preparation processes are necessary.

The influence of substitutionally-incorporated divalent lead ions in the crystal field on the shifting of emission characteristics depends upon the substituted ions. When divalent lead ions substitute Sr or Ba in Eu-activated aluminates and/or silicates, the emission maximum tends to be shifted to longer wavelengths due to smaller ionic radii of Pb as compared with the ionic radii of Ba and Sr. That leads to a stronger crystal field surrounding the activator ion.

A similar effect shows the substitution of divalent copper ions for alkaline earth ions. Here, an additional influence is effective. Due to the higher ionic potential of copper as a quotient of ionic charge and ionic radius compared to the bigger alkaline earth ions, the copper ions can attract the neighboring oxygen ions stronger than the alkaline earth ions. So the substitution of the bigger alkaline earth ions Ca, Sr and Ba by copper leads to a stronger crystal field in the surrounding of the activator ions, too. Thus, the shape of emission bands can be influenced, the shifting of the emission peak to longer wavelength is connected in a broadening of the emission curves for band emission. In addition, it should be possible to increase the intensity of emission by substitution of ions copper and lead. Generally, the shifting of emission peaks to longer or shorter wavelengths are desirable in the field of LED lighting. Here, it is necessary to realize a fine tuning to get a special wavelength for desired color points as well as for better brightness of optical devices. By using cations, copper and lead, such a fine tuning should be possible.

As described above, the luminescent material may include one or more chemical compounds such as, for example, aluminates, silicates, antimonates, germinates, germinate-silicates, and/or phosphates. Exemplary embodiments of these luminescent materials are described in greater detail below.

Example 1

Luminescent materials for ultraviolet light or visible light excitation comprise lead- and/or copper-containing aluminates exemplarily characterized according to the formula as follows:

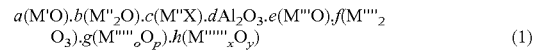

(1)

wherein M' may be Pb, Cu, and/or any combination thereof; M" may be one or more monovalent elements, for example, Li, Na, K, Rb, Cs, Au, Ag, and/or any combination thereof; M''' may be one or more divalent elements, for example, Be, Mg, Ca, Sr, Ba, Zn, Cd, Mn, and/or any combination thereof; M'''' may be one or more trivalent elements, for example, Sc, B, Ga, In, and/or any combination thereof; M''''' may be Si, Ge, Ti, Zr, Mn, V, Nb, Ta, W, Mo, and/or any combination thereof; M'''''' may be Bi, Sn, Sb, Sc, Y, La, Ce, Pr, Nd, Pm, Sm, Eu, Gd, Tb, Dy, Ho, Er, Tm, Yb, Lu, and/or any combination thereof; X may be F, Cl, Br, I, and/or any combination thereof; $0<a\leq2$; $0\leq b\leq2$; $0\leq c\leq2$; $0<d\leq8$; $0<e\leq4$; $0\leq f\leq3$; $0\leq g\leq8$; $0<h\leq2$; $1\leq o\leq2$; $1\leq p\leq5$; $1\leq x\leq2$; and $1\leq y\leq5$.

$$a(M'O).b(M''_2O).c(M''X).4\text{-}a\text{-}b\text{-}c(M'''O).7(Al_2O_3).d(B_2O_3).e(Ga_2O_3).f(SiO_2).g(GeO_2).h(M''''_xO_y) \quad (2)$$

wherein M' may be Pb, Cu, and/or any combination thereof; M'' may be one or more monovalent elements, for example, Li, Na, K, Rb, Cs, Au, Ag, and/or any combination thereof; M''' may be one or more divalent elements, for example, Be, Mg, Ca, Sr, Ba, Zn, Cd, Mn, and/or any combination thereof; M'''' may be Bi, Sn, Sb, Sc, Y, La, In, Ce, Pr, Nd, Pm, Sm, Eu, Gd, Tb, Dy, Ho, Er, Tm, Yb, Lu, and any combination thereof; X may be F, Cl, Br, I, and any combination thereof; $0<a\leq4$; $0\leq b\leq2$; $0\leq c\leq2$; $0\leq d\leq1$; $0\leq e\leq1$; $0\leq f\leq1$; $0\leq g\leq1$; $0<h\leq2$; $1\leq x\leq2$; and $1\leq y\leq5$.

The preparation of copper—as well as lead-containing luminescent materials may be a basic solid state reaction. Pure starting materials without any impurities, e.g. iron, may be used. Any starting material which may transfer into oxides via a heating process may be used to form oxygen dominated phosphors.

Examples of Preparation:

Preparation of the luminescent material having formula (3)

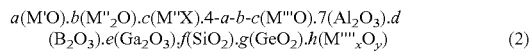
$$Cu_{0.02}Sr_{3.98}Al_{14}O_{25}:Eu \quad (3)$$

Starting materials: CuO, SrCO$_3$, Al(OH)$_3$, Eu$_2$O$_3$, and/or any combination thereof.

The starting materials in the form of oxides, hydroxides, and/or carbonates may be mixed in stoichiometric proportions together with small amounts of flux, e.g., H$_3$BO$_3$. The mixture may be fired in an alumina crucible in a first step at about 1,200° C. for about one hour. After milling the pre-fired materials a second firing step at about 1,450° C. in a reduced atmosphere for about 4 hours may be followed. After that the material may be milled, washed, dried and sieved. The resulting luminescent material may have an emission maximum of about 494 nm.

TABLE 1 copper containing Eu$^{2+}$-activated aluminate compared with Eu$^{2+}$-activated aluminate without copper at about 400 nm excitation wavelength

|  | Compound containing copper Cu$_{0.02}$Sr$_{3.98}$Al$_{14}$O$_{25}$:Eu | Compound without copper Sr$_4$Al$_{14}$O$_{25}$:Eu |
|---|---|---|
| Luminous density (%) | 103.1 | 100 |
| Wavelength (nm) | 494 | 493 |

Preparation of the luminescent material having formula (4)

$$Pb_{0.05}Sr_{3.95}Al_{14}O_{25}:Eu \quad (4)$$

Starting materials: PbO, SrCO$_3$, Al$_2$O$_3$, Eu$_2$O$_3$, and/or any combination thereof.

The starting materials in form of very pure oxides, carbonates, or other components which may decompose thermally into oxides, may be mixed in stoichiometric proportion together with small amounts of flux, for example, H$_3$BO$_3$. The mixture may be fired in an alumina crucible at about 1,200° C. for about one hour in the air. After milling the pre-fired materials a second firing step at about 1,450° C. in air for about 2 hours and in a reduced atmosphere for about 2 hours may be followed. Then the material may be milled, washed, dried, and sieved. The resulting luminescent material may have an emission maximum of from about 494.5 nm.

TABLE 2 lead-containing Eu$^{2+}$-activated aluminate compared with Eu$^{2+}$-activated aluminate without lead at about 400 nm excitation wavelength

|  | Lead-containing compound Pb$_{0.05}$Sr$_{3.95}$Al$_{14}$O$_{25}$:Eu | Compound without lead Sr$_4$Al$_{14}$O$_{25}$:Eu |
|---|---|---|
| Luminous density (%) | 101.4 | 100 |
| Wavelength (nm) | 494.5 | 493 |

TABLE 3 optical properties of some copper-and/or lead-containing aluminates excitable by long wave ultraviolet and/or by visible light and their luminous density in % at 400 nm excitation wavelength

| Composition | Possible excitation range(nm) | Luminous density at 400 nm excitation compared with compounds not containing copper/lead (%) | Peak wave length of lead- and/or copper containing materials (nm) | Peak wave length of materials without lead/copper(nm) |
|---|---|---|---|---|
| Cu$_{0.5}$Sr$_{3.5}$Al$_{14}$O$_{25}$:Eu | 360-430 | 101.2 | 495 | 493 |
| Cu$_{0.02}$Sr$_{3.98}$Al$_{14}$O$_{25}$:Eu | 360-430 | 103.1 | 494 | 493 |
| Pb$_{0.05}$Sr$_{3.95}$Al$_{14}$O$_{25}$:Eu | 360-430 | 101.4 | 494.5 | 493 |
| Cu$_{0.01}$Sr$_{3.99}$Al$_{13.995}$Si$_{0.005}$O$_{25}$:Eu | 360-430 | 103 | 494 | 492 |
| Cu$_{0.01}$Sr$_{3.395}$Ba$_{0.595}$Al$_{14}$O$_{25}$:Eu, Dy | 360-430 | 100.8 | 494 | 493 |
| Pb$_{0.05}$Sr$_{3.95}$Al$_{13.95}$Ga$_{0.05}$O$_{25}$:Eu | 360-430 | 101.5 | 494 | 494 |

Example 2

Luminescent materials for ultraviolet light or visible light excitation comprise lead and/or copper doped aluminates according to the formula as follows:

$$a(M'O).b(M''O).c(Al_2O_3).d(M'''_2O_3).e(M''''O_2).f(M'''''_xO_y)$$ (5)

wherein M' may be Pb, Cu, and/or any combination thereof; M" may be Be, Mg, Ca, Sr, Ba, Zn, Cd, Mn, and/or any combination thereof; M'" may be B, Ga, In, and/or any combination thereof; M"" may be Si, Ge, Ti, Zr, Hf, and/or any combination thereof; M""' may be Bi, Sn, Sb, Sc, Y, La, Ce, Pr, Nd, Pm, Sm, Eu, Gd, Tb, Dy, Ho, Er, Tm, Yb, Lu, and/or any combination thereof; $0<a\leq1$; $0\leq b\leq2$; $0<c\leq8$; $0\leq d\leq1$; $0\leq e\leq1$; $0<f\leq2$; $1\leq x\leq2$; and $1\leq y\leq5$.

The luminous peak and density of Example 2 are described in Table 7, which will be shown below.

Example of Preparation:
Preparation of the luminescent material having formula (6)

$$Cu_{0.05}Sr_{0.95}Al_{1.9997}Si_{0.0003}O_4:Eu$$ (6)

Starting materials: CuO, SrCO$_3$, Al$_2$O$_3$, SiO$_2$, Eu$_2$O$_3$, and/or any combination thereof.

The starting materials in the form of, for example, pure oxides and/or as carbonates may be mixed in stoichiometric proportions together with small amounts of flux, for example, AlF$_3$. The mixture may be fired in an alumina crucible at about 1,250° C. in a reduced atmosphere for about 3 hours. After that the material may be milled, washed, dried and sieved. The resulting luminescent material may have an emission maximum of about 521.5 nm.

TABLE 4 copper containing Eu$^{2+}$-activated aluminate compared with Eu$^{2+}$-activated aluminate without copper at about 400 nm excitation wavelength

|  | Compound contaiging copper $Cu_{0.05}Sr_{0.95}Al_{1.9997}Si_{0.0003}O_4$:Eu | Compound without copper $SrAl_2O_4$:Eu |
|---|---|---|
| Luminous density (%) | 106 | 100 |
| Wavelength (nm) | 521.5 | 519 |

Preparation of the luminescent material having formula (7)

$$Cu_{0.12}BaMg_{1.88}Al_{16}O_{27}:Eu$$ (7)

Starting materials: CuO, MgO, BaCO$_3$, Al(OH)$_3$, Eu$_2$O$_3$, and/or any combination thereof.

The starting materials in the form of, for example, pure oxides, hydroxides, and/or carbonates may be mixed in stoichiometric proportions together with small amounts of flux, for example, AlF$_3$. The mixture may be fired in an alumina crucible at about 1,420° C. in a reduced atmosphere for about 2 hours. After that the material may be milled, washed, dried, and sieved. The resulting luminescent material may have an emission maximum of about 452 nm.

TABLE 5 copper-containing Eu$^{2+}$-activated aluminate compared with copper not doped Eu$^{2+}$-activated aluminate at 400 nm excitation wavelength

|  | Compound containing copper $Cu_{0.12}BaMg_{1.88}Al_{16}O_{27}$:Eu | Comparison without copper $BaMg_2Al_{16}O_{27}$:Eu |
|---|---|---|
| Luminous density (%) | 101 | 100 |
| Wavelength (nm) | 452 | 450 |

Preparation of the luminescent material having formula (8)

$$Pb_{0.1}Sr_{0.9}Al_2O_4:Eu$$ (8)

Starting materials: PbO, SrCO$_3$, Al(OH)$_3$, Eu$_2$O$_3$, and/or any combination thereof.

The starting materials in form of, for example, pure oxides, hydroxides, and/or carbonates may be mixed in stoichiometric proportions together with small amounts of flux, for example, H$_3$BO$_3$. The mixture may be fired in an alumina crucible at about 1,000° C. for about 2 hours in the air. After milling the pre-fired materials a second firing step at about 1,420° C. in the air for about 1 hour and in a reduced atmosphere for about 2 hours may be followed. After that the material may be milled, washed, dried and sieved. The resulting luminescent material may have an emission maximum of about 521 nm.

TABLE 6 lead-containing Eu$^{2+}$-activated aluminate compared with Eu$^{2+}$-activated aluminate without lead at about 400 nm excitation wavelength

|  | Lead-containing compound $Pb_{0.1}Sr_{0.9}Al_2O_4$:Eu | Compound without lead $SrAl_2O_4$:Eu |
|---|---|---|
| Luminous density (%) | 102 | 100 |
| Wavelength (nm) | 521 | 519 |

Results obtained in regard to copper and/or lead doped aluminates are shown in table 7.

TABLE 7 optical properties of some copper-and/or lead-containing aluminates excitable by long wave ultraviolet and/or by visible light and their luminous density in % at 400 nm excitation wavelength

| Composition | Possible excitation range (nm) | Luminous density at 400 nm excitation compared with copper/lead not doped compounds (%) | Peak wave length of lead/copper doped materials (nm) | Peak wave length of materials without lead/copper (nm) |
|---|---|---|---|---|
| $Cu_{0.05}Sr_{0.95}Al_{1.9997}Si_{0.0003}O_4$:Eu | 360-440 | 106 | 521.5 | 519 |
| $Cu_{0.2}Mg_{0.7995}Li_{0.0005}Al_{1.9}Ga_{0.1}O_4$:Eu, Dy | 360-440 | 101.2 | 482 | 480 |

TABLE 7-continued optical properties of some copper-and/or lead-containing aluminates excitable by long wave ultraviolet
and/or by visible light and their luminous density in % at 400 nm excitation wavelength

| Composition | Possible excitation range (nm) | Luminous density at 400 nm excitation compared with copper/lead not doped compounds (%) | Peak wave length of lead/copper doped materials (nm) | Peak wave length of materials without lead/copper (nm) |
|---|---|---|---|---|
| $Pb_{0.1}Sr_{0.9}Al_2O_4$:Eu | 360-440 | 102 | 521 | 519 |
| $Cu_{0.05}BaMg_{1.95}Al_{16}O_{27}$:Eu, Mn | 360-400 | 100.5 | 451, 515 | 450, 515 |
| $Cu_{0.12}BaMg_{1.88}Al_{16}O_{27}$:Eu | 360-400 | 101 | 452 | 450 |
| $Cu_{0.01}BaMg_{0.99}Al_{10}O_{17}$:Eu | 360-400 | 102.5 | 451 | 449 |
| $Pb_{0.1}BaMg_{0.9}Al_{9.5}Ga_{0.5}O_{17}$:Eu, Dy | 360-400 | 100.8 | 448 | 450 |
| $Pb_{0.08}Sr_{0.902}Al_2O_4$:Eu, Dy | 360-440 | 102.4 | 521 | 519 |
| $Pb_{0.2}Sr_{0.8}Al_2O_4$:Mn | 360-440 | 100.8 | 658 | 655 |
| $Cu_{0.06}Sr_{0.94}Al_2O_4$:Eu | 360-440 | 102.3 | 521 | 519 |
| $Cu_{0.05}Ba_{0.94}Pb_{0.06}Mg_{0.95}Al_{10}O_{17}$:Eu | 360-440 | 100.4 | 451 | 449 |
| $Pb_{0.3}Ba_{0.7}Cu_{0.1}Mg_{1.9}Al_{16}O_{27}$:Eu | 360-400 | 100.8 | 452 | 450 |
| $Pb_{0.3}Ba_{0.7}Cu_{0.1}Mg_{1.9}Al_{16}O_{27}$:Eu, Mn | 360-400 | 100.4 | 452, 515 | 450, 515 |

Example 3

Luminescent materials for ultraviolet light or visible light excitation comprise lead and/or copper doped silicates according to the formula as follows:

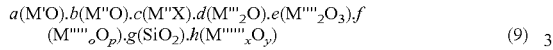

$$a(M'O).b(M''O).c(M''X).d(M'''_2O).e(M''''_2O_3).f(M'''''_oO_p).g(SiO_2).h(M''''''_xO_y) \qquad (9)$$

wherein M' may be Pb, Cu, and/or any combination thereof; M'' may be Be, Mg, Ca, Sr, Ba, Zn, Cd, Mn, and/or any combination thereof; M''' may be Li, Na, K, Rb, Cs, Au, Ag, and/or any combination thereof; M'''' may be Al, Ga, In, and/or any combination thereof; M''''' may be Ge, V, Nb, Ta, W, Mo, Ti, Zr, Hf, and/or any combination thereof; M'''''' may be Bi, Sn, Sb, Sc, Y, La, Ce, Pr, Nd, Pm, Sm, Eu, Gd, Tb, Dy, Ho, Er, Tm, Yb, Lu, and/or any combination thereof; X may be F, Cl, Br, I, and any combination thereof; $0 < a \le 2$; $0 < b \le 8$; $0 \le c \le 4$; $0 \le d \le 2$; $0 \le e \le 2$; $0 \le f \le 2$; $0 < g \le 10$; $0 < h \le 5$; $1 \le o \le 2$; $1 \le p \le 5$; $1 \le x \le 2$; and $1 \le y \le 5$.

The copper-containing silicates exemplarily described herein may, in some embodiments, contain $SiO_4$ and be characterized as having an Olivine structure (orthorhombic) or $\beta$-$K_2SO_4$ structure (orthorhombic); contain $Si_2O_8$ and be characterized as having a trigonal Glaserite ($K_3Na(SO_4)_2$) or monoclinic Merwinite structure; contain $Si_2O_7$ and be characterized as having a tetragonal Ackermanite structure; contain $SiO_5$ and be characterized as having a tetragonal structure; and/or contain $Si_2O_5$ and be characterized as having an orthorhombic structure.

The superior luminous density of Example 3 can be seen below.

Example of Preparation:

Preparation of the luminescent material having formula (10)

$$Cu_{0.05}Sr_{1.7}Ca_{0.25}SiO_4:Eu \qquad (10)$$

Starting materials: $CuO$, $SrCO_3$, $CaCO_3$, $SiO_2$, $Eu_2O_3$, and/or any combination thereof.

The starting materials in the form of pure oxides and/or carbonates may be mixed in stoichiometric proportions together with small amounts of flux, for example, $NH_4Cl$. The mixture may be fired in an alumina crucible at about 1,200° C. in an inert gas atmosphere (e.g., $N_2$ or noble gas) for about 2 hours. Then the material may be milled. After that, the material may be fired in an alumina crucible at about 1,200° C. in a slightly reduced atmosphere for about 2 hours. Then, the material may be milled, washed, dried, and sieved. The resulting luminescent material may have an emission maximum at about 592 nm.

TABLE 8 copper-containing $Eu^{2+}$-activated silicate compared with $Eu^{2+}$-activated silicate without copper at about 400 nm excitation wavelength

| | Copper-containing compound $Cu_{0.05}Sr_{1.7}Ca_{0.25}SiO_4$:Eu | Compound without copper $Sr_{1.7}Ca_{0.3}SiO_4$:Eu |
|---|---|---|
| Luminous density (%) | 104 | 100 |
| Wavelength (nm) | 592 | 588 |

Preparation of the luminescent material having formula (II):

$$Cu_{0.2}Ba_2Zn_{0.2}Mg_{0.6}Si_2O_7:Eu \qquad (11)$$

Starting materials: $CuO$, $BaCO_3$, $ZnO$, $MgO$, $SiO_2$, $Eu_2O_3$, and/or any combination thereof.

The starting materials in the form of very pure oxides and carbonates may be mixed in stoichiometric proportions together with small amounts of flux, for example, $NH_4Cl$. In a first step the mixture may be fired in an alumina crucible at about 1,100° C. in a reduced atmosphere for about 2 hours. Then the material may be milled. After that the material may be fired in an alumina crucible at about 1,235° C. in a reduced atmosphere for about 2 hours. Then that the material may be milled, washed, dried and sieved. The resulting luminescent material may have an emission maximum at about 467 nm.

TABLE 9 copper-containing $Eu^{2+}$-activated silicate compared with $Eu^{2+}$-activated silicate without copper at 400 nm excitation wavelength

| | Copper-containing compound $Cu_{0.2}Sr_2Zn_{0.2}Mg_{0.6}Si_2O_7$:Eu | Compound without copper $Sr_2Zn_2Mg_{0.6}Si_2O_7$:Eu |
|---|---|---|
| Luminous density (%) | 101.5 | 100 |
| Wavelength (nm) | 467 | 465 |

Preparation of the luminescent material having formula (12)

$$Pb_{0.1}Ba_{0.95}Sr_{0.95}Si_{0.998}Ge_{0.002}O_4:Eu \quad (12)$$

Starting materials: PbO, SrCO$_3$, BaCO$_3$, SiO$_2$, GeO$_2$, Eu$_2$O$_3$, and/or any combination thereof.

The starting materials in the form of oxides and/or carbonates may be mixed in stoichiometric proportions together with small amounts of flux, for example, NH$_4$Cl. The mixture may be fired in an alumina crucible at about 1,000° C. for about 2 hours in the air. After milling the pre-fired materials a second firing step at 1,220° C. in air for 4 hours and in reducing atmosphere for 2 hours may be followed. After that the material may be milled, washed, dried and sieved. The resulting luminescent material may have an emission maximum at about 527 nm.

TABLE 10 lead-containing Eu$^{2+}$-activated silicate compared with Eu$^{2+}$-activated silicate without lead at about 400 nm excitation wavelength

|  | Lead-containing compound $Pb_{0.1}Ba_{0.95}Sr_{0.95}Si_{0.998}Ge_{0.002}O_4:Eu$ | Compound without lead BaSrSiO$_4$:Eu |
|---|---|---|
| Luminous density (%) | 101.3 | 100 |
| Wavelength (nm) | 527 | 525 |

Preparation of the luminescent material having formula (13)

$$Pb_{0.25}Sr_{3.75}Si_3O_8Cl_4:Eu \quad (13)$$

Starting materials: PbO, SrCO$_3$, SrCl$_2$, SiO$_2$, Eu$_2$O$_3$, and any combination thereof.

The starting materials in the form of oxides, chlorides, and/or carbonates may be mixed in stoichiometric proportions together with small amounts of flux, for example, NH$_4$Cl. The mixture may be fired in an alumina crucible in a first step at about 1,100° C. for about 2 hours in the air. After milling the pre-fired materials a second firing step at about 1,220° C. in the air for about 4 hours and in a reduced atmosphere for about 1 hour may be followed. After that the material may be milled, washed, dried and sieved. The resulting luminescent material may have an emission maximum at about 492 nm.

TABLE 11 lead-containing Eu$^{2+}$-activated chlorosilicate compared with Eu$^{2+}$-activated chlorosilicate without lead at 400 nm excitation wavelength

|  | Lead-containing compound $Pb_{0.25}Sr_{3.75}Si_3O_8Cl_4:Eu$ | Compound without lead Sr$_4$Si$_3$O$_8$Cl$_4$:Eu |
|---|---|---|
| Luminous density (%) | 100.6 | 100 |
| Wavelength (nm) | 492 | 490 |

Results obtained with respect to copper- and/or lead-containing silicates are shown in table 12.

TABLE 12 optical properties of some copper- and/or lead-containing rare earth activated silicates excitable by long wave ultraviolet and/or by visible light and their luminous density in % at about 400 nm excitation wavelength

| Composition | Possible excitation range (nm) | Luminous density at 400 nm excitation compared with copper/lead not doped compounds (%) | Peak wave length of lead-and/or copper-containing materials (nm) | Peak wave length of materials without lead/copper (nm) |
|---|---|---|---|---|
| $Pb_{0.1}Ba_{0.95}Sr_{0.95}Si_{0.998}Ge_{0.002}O_4:Eu$ | 360-470 | 101.3 | 527 | 525 |
| $Cu_{0.02}(Ba,Sr,Ca,Zn)_{1.98}SiO_4:Eu$ | 360-500 | 108.2 | 565 | 560 |
| $Cu_{0.05}Sr_{1.7}Ca_{0.25}SiO_4:Eu$ | 360-470 | 104 | 592 | 588 |
| $Cu_{0.05}Li_{0.002}Sr_{1.5}Ba_{0.448}SiO_4:Gd,Eu$ | 360-470 | 102.5 | 557 | 555 |
| $Cu_{0.2}Sr_2Zn_{0.2}Mg_{0.6}Si_2O_7:Eu$ | 360-450 | 101.5 | 467 | 465 |
| $Cu_{0.02}Ba_{2.8}Sr_{0.2}Mg_{0.98}Si_2O_8:Eu,Mn$ | 360-420 | 100.8 | 440, 660 | 438, 660 |
| $Pb_{0.25}Sr_{3.75}Si_3O_8Cl_4:Eu$ | 360-470 | 100.6 | 492 | 490 |
| $Cu_{0.2}Ba_{2.2}Sr_{0.75}Pb_{0.05}Zn_{0.8}Si_2O_8:Eu$ | 360-430 | 100.8 | 448 | 445 |
| $Cu_{0.2}Ba_3Mg_{0.8}Si_{1.99}Ge_{0.01}O_8:Eu$ | 360-430 | 101 | 444 | 440 |
| $Cu_{0.5}Zn_{0.5}Ba_2Ge_{0.2}Si_{1.8}O_7:Eu$ | 360-420 | 102.5 | 435 | 433 |
| $Cu_{0.8}Mg_{0.2}Ba_3Si_2O_8:Eu,Mn$ | 360-430 | 103 | 438, 670 | 435, 670 |
| $Pb_{0.15}Ba_{1.84}Zn_{0.01}Si_{0.99}Zr_{0.01}O_4:Eu$ | 360-500 | 101 | 512 | 510 |
| $Cu_{0.2}Ba_5Ca_{2.8}Si_4O_{16}:Eu$ | 360-470 | 101.8 | 495 | 491 |

Example 4

Luminescent materials for ultraviolet light or visible light excitation comprise lead and/or copper-containing antimonates according to the formula as follows:

$$a(M'O).b(M''_2O).c(M'X).d(Sb_2O_5).e(M'''O).f(M''''_xO_y) \quad (14)$$

wherein M' may be Pb, Cu, and/or any combination thereof; M'' may be Li, Na, K, Rb, Cs, Au, Ag, and/or any combination thereof; M''' may be Be, Mg, Ca, Sr, Ba, Zn, Cd, Mn, and/or any combination thereof; M'''' may be Bi, Sn, Sc, Y, La, Pr, Sm, Eu, Tb, Dy, Gd, and/or any combination thereof; X may be F, Cl, Br, I, and/or any combination thereof; $0<a\leq2$; $0\leq b\leq2$; $0\leq c\leq4$; $0\leq d\leq8$; $0\leq e\leq8$; $0<f\leq2$; $1\leq x\leq2$; and $1\leq y\leq5$.

Examples of Preparation:

Preparation of the luminescent material having formula (15)

$$Cu_{0.2}Mg_{1.7}Li_{0.2}Sb_2O_7:Mn \quad (15)$$

Starting materials: CuO, MgO, Li$_2$O, Sb$_2$O$_5$, MnCO$_3$, and/or any combination thereof.

The starting materials in the form of oxides may be mixed in stoichiometric proportion together with small amounts of flux. In a first step the mixture may be fired in an alumina crucible at about 985° C. in the air for about 2 hours. After pre-firing the material may be milled again. In a second step the mixture may be fired in an alumina crucible at about 1,200° C. in an atmosphere containing oxygen for about 8 hours. After that the material may be milled, washed, dried and sieved. The resulting luminescent material may have an emission maximum at about 626 nm.

TABLE 13 copper-containing antimonate compared with antimonate without copper at about 400 nm excitation wavelength

| | Copper-containing compound Cu$_{0.2}$Mg$_{1.7}$Li$_{0.2}$Sb$_2$O$_7$:Mn | Comparison without copper Mg$_2$Li$_{0.2}$Sb$_2$O$_7$:Mn |
|---|---|---|
| Luminous density (%) | 101.8 | 100 |
| Wavelength (nm) | 652 | 650 |

Preparation of the luminescent material having formula (16)

$$Pb_{0.006}Ca_{0.6}Sr_{0.394}Sb_2O_6 \quad (16)$$

Starting materials: PbO, CaCO$_3$, SrCO$_3$, Sb$_2$O$_5$, and/or any combination thereof.

The starting materials in the form of oxides and/or carbonates may be mixed in stoichiometric proportions together with small amounts of flux. In a first step the mixture may be fired in an alumina crucible at about 975° C. in the air for about 2 hours. After pre-firing the material may be milled again. In a second step the mixture may be fired in an alumina crucible at about 1,175° C. in the air for about 4 hours and then in an oxygen-containing atmosphere for about 4 hours. After that the material may be milled, washed, dried and sieved. The resulting luminescent material may have an emission maximum at about 637 nm.

TABLE 14 lead-containing antimonate compared with antimonate without lead at 400 nm excitation wavelength

| | Lead-containing compound Pb$_{0.006}$Ca$_{0.6}$Sr$_{0.394}$Sb$_2$O$_6$ | Compound without lead Ca$_{0.6}$Sr$_{0.4}$Sb$_2$O$_6$ |
|---|---|---|
| Luminous density (%) | 102 | 100 |
| Wavelength (nm) | 637 | 638 |

Results obtained in respect to copper- and/or lead-containing antimonates are shown in table 15.

TABLE 15 optical properties of some copper and/or lead-containing antimonates excitable by long wave ultraviolet and/or by visible light and their luminous density in % at about 400 nm excitation wavelength

| Composition | Possible excitation range (nm) | Luminous density at 400 nm excitation compared with copper/lead not doped compounds (%) | Peak wave length of lead-and/or copper-containing materials (nm) | Peak wave length of materials without lead/copper (nm) |
|---|---|---|---|---|
| Pb$_{0.2}$Mg$_{0.002}$Ca$_{1.798}$Sb$_2$O$_6$F$_2$:Mn | 360-400 | 102 | 645 | 649 |
| Cu$_{0.15}$Ca$_{1.845}$Sr$_{0.005}$Sb$_{1.998}$Si$_{0.002}$O$_7$:Mn | 360-400 | 101.5 | 660 | 658 |
| Cu$_{0.2}$Mg$_{1.7}$Li$_{0.2}$Sb$_2$O$_7$:Mn | 360-400 | 101.8 | 652 | 650 |
| Cu$_{0.2}$Pb$_{0.01}$Ca$_{0.79}$Sb$_{1.98}$Nb$_{0.02}$O$_6$:Mn | 360-400 | 98.5 | 658 | 658 |
| Cu$_{0.01}$Ca$_{1.99}$Sb$_{1.9995}$V$_{0.0005}$O$_7$:Mn | 360-400 | 100.5 | 660 | 657 |
| Pb$_{0.006}$Ca$_{0.6}$Sr$_{0.394}$Sb$_2$O$_6$ | 360-400 | 102 | 637 | 638 |
| Cu$_{0.02}$Ca$_{0.9}$Sr$_{0.5}$Ba$_{0.4}$Mg$_{0.18}$Sb$_2$O$_7$ | 360-400 | 102.5 | 649 | 645 |
| Pb$_{0.198}$Mg$_{0.004}$Ca$_{1.798}$Sb$_2$O$_6$F$_2$ | 360-400 | 101.8 | 628 | 630 |

Example 5

Luminescent materials for ultraviolet light or visible light excitation comprise lead- and/or copper-containing germanates and/or a germanate-silicates exemplarily characterized according to the formula as follows:

$$a(M'O)b(M''_2O)c(M''X)dGeO_2e(M'''O)f(M''''_2O_3)g(M'''''_oO_p)h(M''''''_xO_y)$$ (17)

wherein M' may be Pb, Cu, and/or any combination thereof; M'' may be Li, Na, K, Rb, Cs, Au, Ag, and/or any combination thereof; M''' may be Be, Mg, Ca, Sr, Ba, Zn, Cd, and/or any combination thereof; M'''' may be Sc, Y, B, Al, La, Ga, In, and/or any combination thereof; M''''' may be Si, Ti, Zr, Mn, V, Nb, Ta, W, Mo, and/or any combination thereof; M'''''' may be Bi, Sn, Pr, Sm, Eu, Gd, Dy, and/or any combination thereof; X may be F, Cl, Br, I, and/or any combination thereof; $0<a\leq2$; $0\leq b\leq2$; $0\leq c\leq10$; $0<d\leq10$; $0\leq e\leq14$; $0\leq f\leq14$; $0\leq g\leq10$; $0<h\leq2$; $1\leq o\leq2$; $1\leq p\leq5$; $1\leq x\leq2$; and $1\leq y\leq5$.

Example of Preparation:
Preparation of the luminescent material having formula (18)

$$Pb_{0.004}Ca_{1.99}Zn_{0.006}Ge_{0.8}Si_{0.2}O_4:Mn$$ (18)

Starting materials: PbO, CaCO$_3$, ZnO, GeO$_2$, SiO$_2$, MnCO$_3$, and/or any combination thereof, The starting materials in the form of oxides and/or carbonates may be mixed in stoichiometric proportions together with small amounts of flux, for example, NH$_4$Cl. In a first step the mixture may be fired in an alumina crucible at about 1,200° C. in an oxygen-containing atmosphere for about 2 hours. Then, the material may be milled again. In a second step the mixture may be fired in an alumina crucible at about 1,200° C. in oxygen containing atmosphere for about 2 hours. After that the material may be milled, washed, dried and sieved. The resulting luminescent material may have an emission maximum at about 655 nm.

Preparation of the luminescent material having formula (19)

$$Cu_{0.46}Sr_{0.54}Ge_{0.6}Si_{0.4}O_3:Mn$$ (19)

Starting materials: CuO, SrCO$_3$, GeO$_2$, SiO$_2$, MnCO$_3$, and/or any combination thereof.

The starting materials in the form of oxides and/or carbonates may be mixed in stoichiometric proportions together with small amounts of flux, for example, NH$_4$Cl. In a first step the mixture may be fired in an alumina crucible at about 1,100° C. in an oxygen-containing atmosphere for about 2 hours. Then, the material may be milled again. In a second step the mixture may be fired in an alumina crucible at about 1,180° C. in an oxygen-containing atmosphere for about 4 hours. After that the material may be milled, washed, dried and sieved. The resulting luminescent material may have an emission maximum at about 658 nm.

TABLE 17 copper-containing Mn-activated germanate-silicate compared with Mn-activated germanate-silicate without copper at 400 nm excitation wavelength

|  | copper-containing compound $Cu_{0.46}Sr_{0.54}Ge_{0.6}Si_{0.4}O_3:Mn$ | Compound without copper $SrGe_{0.6}Si_{0.4}O_3:Mn$ |
|---|---|---|
| Luminous density (%) | 103 | 100 |
| Wavelength (nm) | 658 | 655 |

TABLE 16 lead-containing Mn-activated germanate compared with Mn-activated germinate without lead at about 400 nm excitation wavelength

|  | Copper-containing compound $Pb_{0.004}Ca_{1.99}Zn_{0.006}Ge_{0.8}Si_{0.2}O_4:Mn$ | Comparison without copper $Ca_{1.99}Zn_{0.01}Ge_{0.8}Si_{0.2}O_4:Mn$ |
|---|---|---|
| Luminous density (%) | 101.5 | 100 |
| Wavelength (nm) | 655 | 657 |

TABLE 18 optical properties of some copper and/or lead-containing germanate-silicates excitable by long wave ultraviolet and/or by visible light and their luminous density in % at about 400 nm excitation wavelength

| Composition | Possible excitation range (nm) | Luminous density at 400 nm excitation compared with copper/lead not containing compounds (%) | Peak wave length of lead- and/or copper-containing materials (nm) | Peak wave length of materials without lead/copper (nm) |
|---|---|---|---|---|
| $Pb_{0.004}Ca_{1.99}Zn_{0.006}Ge_{0.8}Si_{0.2}O_4:Mn$ | 360-400 | 101.5 | 655 | 657 |
| $Pb_{0.002}Sr_{0.954}Ca_{1.044}Ge_{0.93}Si_{0.07}O_4:Mn$ | 360-400 | 101.5 | 660 | 661 |
| $Cu_{0.46}Sr_{0.54}Ge_{0.6}Si_{0.4}O_3:Mn$ | 360-400 | 103 | 658 | 655 |
| $Cu_{0.002}Sr_{0.998}Ba_{0.99}Ca_{0.01}Si_{0.98}Ge_{0.02}O_4:Eu$ | 360-470 | 102 | 538 | 533 |
| $Cu_{1.45}Mg_{26.55}Ge_{9.4}Si_{0.6}O_{48}:Mn$ | 360-400 | 102 | 660 | 657 |
| $Cu_{1.2}Mg_{26.8}Ge_{8.9}Si_{1.1}O_{48}:Mn$ | 360-400 | 103.8 | 670 | 656 |

TABLE 18-continued optical properties of some copper and/or lead-containing germanate-silicates excitable by long wave ultraviolet and/or by visible light and their luminous density in % at about 400 nm excitation wavelength

| Composition | Possible excitation range (nm) | Luminous density at 400 nm excitation compared with copper/lead not containing compounds (%) | Peak wave length of lead- and/or copper- containing materials (nm) | Peak wave length of materials without lead/copper (nm) |
|---|---|---|---|---|
| $Cu_4Mg_{20}Zn_4Ge_5Si_{2.5}O_{38}F_{10}$:Mn | 360-400 | 101.5 | 658 | 655 |
| $Pb_{0.001}Ba_{0.849}Zn_{0.05}Sr_{1.1}Ge_{0.04}Si_{0.96}O_4$:Eu | 360-470 | 101.8 | 550 | 545 |
| $Cu_{0.05}Mg_{4.95}GeO_6F_2$:Mn | 360-400 | 100.5 | 655 | 653 |
| $Cu_{0.05}Mg_{3.95}GeO_{5.5}F$:Mn | 360-400 | 100.8 | 657 | 653 |

Example 6

Luminescent materials for ultraviolet light or visible light excitation comprise lead and/or copper-containing phosphates exemplarily characterized according to the formula as follows:

$$a(M'O)b(M''_2O)c(M'''X)dP_2O_5e(M'''O)f(M''''_2O_3)g(M'''''O_2)h(M''''''_xO_y) \quad (20)$$

wherein M' may be Pb, Cu, and/or any combination thereof; M'' may be Li, Na, K, Rb, Cs, Au, Ag, and/or any combination thereof; M''' may be Be, Mg, Ca, Sr, Ba, Zn, Cd, Mn, and/or any combination thereof; M'''' may be Sc, Y, B, Al, La, Ga, In, and/or any combination thereof, M''''' may be Si, Ge, Ti, Zr, Hf; V, Nb, Ta, W, Mo, and/or any combination thereof; M'''''' may be Bi, Sn, Pr, Sm, Eu, Gd, Dy, Ce, Tb, and/or any combination thereof; X may be F, Cl, Br, I, and/or any combination thereof; $0<a\leq2$; $0\leq b\leq12$; $0\leq c\leq16$; $0<d\leq3$; $0\leq e\leq5$; $0\leq f\leq3$; $0\leq g\leq2$; $0<h\leq2$; $1\leq x\leq2$; and $1\leq y\leq5$.

The luminescent materials comprising the lead and/or copper-containing phosphates may be used as compounds for ultraviolet light in a light emitting device.

Examples of Preparation:
Preparation of the luminescent material having formula (21)

$$Cu_{0.02}Ca_{4.98}(PO_4)_3Cl:Eu \quad (21)$$

Starting materials: CuO, $CaCO_3$, $Ca_3(PO_4)_2$, $CaCl_2$, $Eu_2O_3$, and/or any combination thereof, The starting materials in the form of oxides, phosphates, and/or carbonates and chlorides may be mixed in stoichiometric proportions together with small amounts of flux. The mixture may be fired in an alumina crucible at about 1,240° C. in reducing atmosphere for about 2 hours. After that the material may be milled, washed, dried and sieved. The luminescent material may have an emission maximum at about 450 nm.

TABLE 19 copper-containing $Eu^{2+}$-activated chlorophosphate compared with $Eu^{2+}$-activated chlorophosphate without copper at about 400 nm excitation wavelength

| | Copper-containing compound $Cu_{0.02}Ca_{4.98}(PO_4)_3Cl:Eu$ | Compound without copper $Ca_5(PO_4)_3Cl:Eu$ |
|---|---|---|
| Luminous density (%) | 101.5 | 100 |
| Wavelength (nm) | 450 | 447 |

TABLE 20 copper- and/or lead-containing phosphates excitable by long wave ultraviolet and/or by visible light and their luminous density in % at about 400 nm excitation wavelength

| Composition | Possible excitation range (nm) | Luminous density at 400 nm excitation compared with copper/lead not doped compounds (%) | Peak wave length of lead/copper- containing materials (nm) | Peak wave length of materials without lead/copper (nm) |
|---|---|---|---|---|
| $Cu_{0.02}Sr_{4.98}(PO_4)_3Cl:Eu$ | 360-410 | 101.5 | 450 | 447 |
| $Cu_{0.2}Mg_{0.8}BaP_2O_7:Eu, Mn$ | 360-400 | 102 | 638 | 635 |
| $Pb_{0.5}Sr_{1.5}P_{1.84}B_{0.16}O_{6.84}:Eu$ | 360-400 | 102 | 425 | 420 |
| $Cu_{0.5}Mg_{0.5}Ba_2(P,Si)_2O_8:Eu$ | 360-400 | 101 | 573 | 570 |
| $Cu_{0.5}Sr_{9.5}(P,B)_6O_{24}Cl_2:Eu$ | 360-410 | 102 | 460 | 456 |
| $Cu_{0.5}Ba_3Sr_{6.5}P_6O_{24}(F,Cl)_2:Eu$ | 360-410 | 102 | 443 | 442 |
| $Cu_{0.05}(Ca,Sr,Ba)_{4.95}P_3O_{12}Cl:Eu, Mn$ | 360-410 | 101.5 | 438, 641 | 435, 640 |
| $Pb_{0.1}Ba_{2.9}P_2O_8:Eu$ | 360-400 | 103 | 421 | 419 |

Lead- and/or copper-containing luminescent materials exemplarily described above can be act as converter for light emitting devices, such as ultraviolet as well as blue emitting LEDs, back lights and painting pigments. They can convert the excitation wavelength from the ultraviolet and blue light to longer visible wavelength. According to some embodiments, one or more of the lead- and/or copper-containing luminescent materials exemplarily described above may be used or mixed to produce a luminescent material with a color temperature ranging from about 2,000K to about 8,0000K or about 10,000K and superior color rendering index of greater than about 60 (e.g. between about 60 and about 90, or greater than about 90, or between about 90 and about 95). Thus, for all color temperatures as well as for all color coordinates inside of the white light coordinates, an appropriate luminescent material or mixture thereof can be found.

What is claimed is:

1. A luminescent material for a light emitting diode (LED), comprising a compound comprising a host lattice and a luminescent ion, the luminescent ion comprising at least one rare earth element within the host lattice, wherein the host lattice comprises first ions and oxygen,
wherein a portion of the first ions is substituted by copper ions, and
wherein the compound is to emit light upon excitation with ultraviolet light or visible light,
wherein the luminescent ion comprises at least one rare earth element, but does not comprise copper ions, and
wherein the compound has the formula:

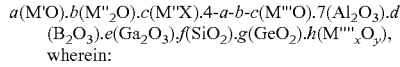

$a(M'O).b(M''_2O).c(M'''X).4\text{-}a\text{-}b\text{-}c(M''''O).7(Al_2O_3).d(B_2O_3).e(Ga_2O_3).f(SiO_2).g(GeO_2).h(M'''''_xO_y)$, wherein:

M' is Cu, or a combination of Cu and Pb;
M'' is Li, Na, K, Rb, Cs, Au, Ag, or any combination thereof;
M''' is Be, Mg, Ca, Sr, Ba, Zn, Cd, Mn, or any combination thereof;
M'''' is Pr, Nd, Pm, Sm, Eu, Gd, Tb, Dy, Ho, Er, Tm, Yb, or any combination thereof, or at least one of Pr, Nd, Pm, Sm, Eu, Gd, Tb, Dy, Ho, Er, Tm, Yb in combination with at least one of Bi, Sn, Sb, Sc, Y, La, Ce, and Lu, or at least one of Pr, Nd, Pm, Sm, Eu, Gd, Tb, Dy, Ho, Er, Tm, Yb in combination with In, or at least one of Sc, Y, La, Ce, and Lu in combination with In;
X is F, Cl, Br, I, or any combination thereof;
$0<a\leq 4$;
$0\leq b\leq 2$;
$0\leq c\leq 2$;
$0\leq d\leq 1$;
$1\leq e\leq 1$;
$0\leq f\leq 1$;
$0\leq g\leq 1$;
$0<h\leq 2$;
$1\leq x\leq 2$; and
$1\leq y\leq 5$.

2. A luminescent material for a light emitting diode (LED), comprising a compound comprising a host lattice and a luminescent ion, the luminescent ion comprising at least one rare earth element within the host lattice, wherein the host lattice comprises first ions and oxygen,
wherein a portion of the first ions is substituted by copper ions, and
wherein the compound is to emit light upon excitation with ultraviolet light or visible light,
wherein the luminescent ion comprises at least one rare earth element, but does not comprise copper ions, and
wherein the compound has the formula:

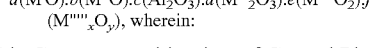

$a(M'O).b(M''O).c(Al_2O_3).d(M'''_2O_3).e(M''''O_2).f(M'''''_xO_y)$, wherein:

M' is Cu, or a combination of Cu and Pb;
M'' is Be, Mg, Ca, Sr, Ba, Zn, Cd, Mn, or any combination of thereof;
M''' is B, Ga, In, or any combination thereof;
M'''' is Si, Ge, Ti, Zr, Hf, or any combination thereof;
M''''' is Pr, Nd, Pm, Sm, Eu, Gd, Tb, Dy, Ho, Er, Tm, Yb, or any combination thereof, or at least one of Pr, Nd, Pm, Sm, Eu, Gd, Tb, Dy, Ho, Er, Tm, Yb in combination with at least one of Sc, Y, La, Ce, and Lu;

$0<a\leq 1$;
$0\leq b\leq 2$;
$0<c\leq 8$;
$0\leq d\leq 1$;
$0\leq e\leq 1$;
$0<f\leq 2$;
$1\leq x\leq 2$; and
$1\leq y\leq 5$.

3. A luminescent material for a light emitting diode (LED), comprising a compound comprising a host lattice and a luminescent ion, the luminescent ion comprising at least one rare earth element within the host lattice, wherein the host lattice comprises first ions and oxygen,
wherein a portion of the first ions is substituted by copper ions, and
wherein the compound is to emit light upon excitation with ultraviolet light or visible light,
wherein the luminescent ion comprises at least one rare earth element, but does not comprise copper ions, and
wherein the compound has the formula:

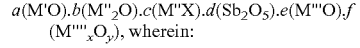

$a(M'O).b(M''_2O).c(M'''X).d(Sb_2O_5).e(M''''O).f(M'''''_xO_y)$, wherein:

M' is Cu, or a combination of Cu and Pb;
M'' is Li, Na, K, Rb, Cs, Au, Ag, or any combination thereof;
M''' is Be, Mg, Ca, Sr, Ba, Zn, Cd, Mn, or any combination thereof;
M'''' is Pr, Sm, Eu, Tb, Dy, Gd, or any combination thereof, or at least one of Pr, Sm, Eu, Gd, Tb, Dy, in combination with at least one of Bi, Sn, Sc, Y, and La;
X is F, Cl, Br, I, or any combination thereof;
$0<a\leq 2$;
$0\leq b\leq 2$;
$0\leq c\leq 4$;
$0<d\leq 8$;
$0\leq e\leq 8$;
$0\leq f\leq 2$;
$1\leq x\leq 2$; and
$1\leq y\leq 5$.

4. A luminescent material for a light emitting diode (LED), comprising a compound comprising a host lattice and a luminescent ion, the luminescent ion comprising at least one rare earth element within the host lattice, wherein the host lattice comprises first ions and oxygen,
wherein a portion of the first ions is substituted by copper ions, and
wherein the compound is to emit light upon excitation with ultraviolet light or visible light,
wherein the luminescent ion comprises at least one rare earth element, but does not comprise copper ions, and
wherein the compound has the formula:

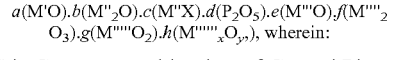

$a(M'O).b(M''_2O).c(M'''X).d(P_2O_5).e(M''''O).f(M'''''_2O_3).g(M''''''O_2).h(M'''''''_xO_y)$, wherein:

M' is Cu, or a combination of Cu and Pb;
M'' is Li, Na, K, Rb, Cs, Au, Ag, or any combination thereof;
M''' is Be, Mg, Ca, Sr, Ba, Zn, Cd, Mn, or any combination thereof;
M'''' is Sc, Y, B, Al, La, Ga, In, or any combination thereof;
M''''' is Si, Ge, Ti, Zr, Hf, V, Nb, Ta, W, Mo, or any combination thereof,
M'''''' is Pr, Sm, Eu, Gd, Dy, Ce, Th, or any combination thereof;
X is F, Cl, Br, I, or any combination thereof;
$0<a\leq 2$;

0≤b≤12;
0≤c≤16;
0<d≤3;
0≤e≤5;
0≤f≤3;
0≤g≤2;
0<h≤2;
1≤x≤2; and
1≤y≤5.

* * * * *